United States Patent Office 3,325,059
Patented June 13, 1967

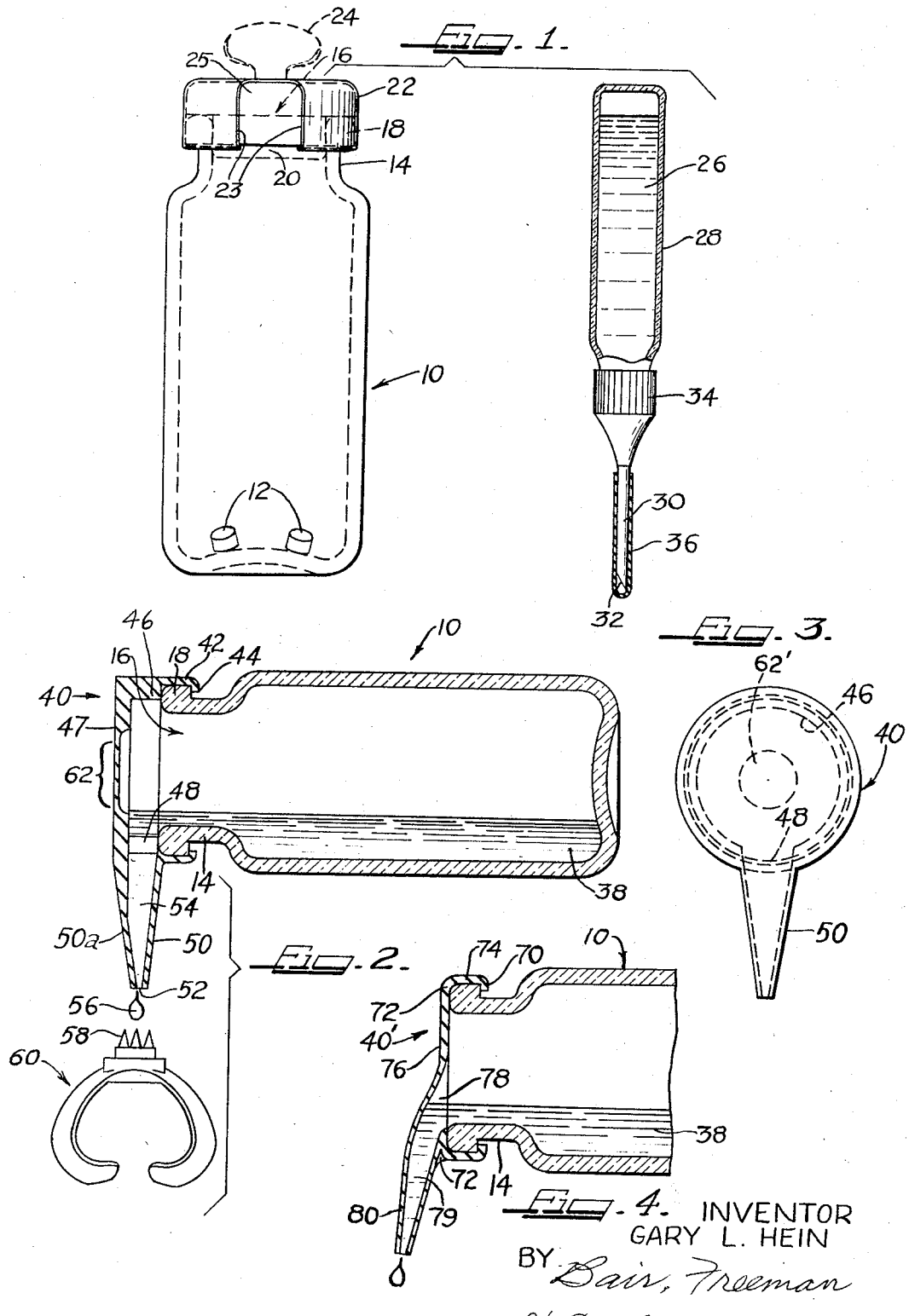

3,325,059
COMBINATION CAP AND DISPENSER FOR
RECONSTITUTED VACCINE
Gary L. Hein, Decatur, Ill., assignor to Lincoln Laboratories, Inc., Decatur, Ill., a corporation of Indiana
Filed July 23, 1965, Ser. No. 474,367
5 Claims. (Cl. 222—207)

This invention relates to a dispenser of liquid biological, and more particularly relates to a device for effecting selectively controlled dispensing of very small amounts of a liquid biological.

In the intradermal inoculation of persons with multiple pressure-punctures, highly satisfactory multiple-point pressure scarifiers have been devised, as for example disclosed in U.S. Patent 3,062,212. Such multiple-point scarifiers provide a very close clustering of the scarifier points, as disclosed in U.S. Patent 3,136,314, in those usages where it is desired to load onto the scarifier points the liquid biological that is to be administered, and to retain such biological on the points by surface tension forces that are developed. When the points are closely clustered and the liquid biological is to be carried by the points prior to inoculation, the amount, or dosage, of biological, required to be deposited on the points, is very small. For example, with nine points clustered in a square dimension of restricted size, so that the spacing of the tips of adjacent pairs is about 0.08 to 0.12 cm., no more than about 0.01 ml. of liquid is required.

The loading of such a very small amount of liquid precisely upon such a close cluster of points raises a number of problems in the providing of a suitable dispenser which will dispense only precise small amounts of liquid biological, and which will prevent wasteful dispensing of excessive amounts of liquid biological. Aside from this obvious economic problem that exists when a costly biological is wastefully dispensed, an excessive dispensing of biological liquid may result in an uncontrolled broadcast of a biological substance that may lead to a dangerous condition.

While it has heretofore been proposed to effect accurately controlled dispensing of biological substances in liquid form from a syringe that has a minutely-bored tubular discharger thereon, it has been observed in practice that such an apparatus provides difficulty in expressing only a fraction of a drop of liquid from such a device because of the large mechanical advantage derivable from such syringe-type mechanisms. Furthermore, such a syringe-type dispenser is normally much too long in its overall size, resulting in that fingers which control the actuation of the plunger, are required to be spaced a considerable distance from the discharge tip of the syringe and hence are unable to accurately "feel" the dispensing of very small amounts of liquid in the order of no more than about 0.01 ml. A further objection is the relatively high cost of such a dispenser.

Thus, one object of this invention is to provide an improved liquid dispenser for effecting accurate manual control of the dispensing of very small amounts of a biological liquid.

Another object of this invention is to provide an improved liquid dispenser that avoids all the said deficiencies of existing dispensers and which is particularly characterized by its simplicity and inexpensiveness of construction, and by its effectiveness in operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIG. 1 illustrates an existing system for re-constituting dried vaccine, wherein a portion of the existing system is for use with the invention of this application;

FIG. 2 illustrates a vertical cross-sectional view of the invention;

FIG. 3 is a top-plan view showing an improved dispensing head as generally seen in FIG. 2, but embodying a modification over that shown in FIG. 2; and FIG. 4 is a fragmentary cross-sectional view similar to a portion of FIG. 2, but showing a modified form of construction.

Referring now to FIG. 1, there is shown a container 10 of glass or the like having a dried or lyophilized vaccine powder, that is conveniently provided in the form of a plurality of pellets 12, stored therein under a substantial vacuum, or at a gas pressure reduced substantially below atmospheric pressure. The container 10 has a neck 14 and a mouth generally indicated at 16. The mouth 16 is surrounded by a radially enlarged lip or flange 18 defined on the container. A pierceable rubber stopper 20 is positioned in mouth 16, and said stopper provides a radially enlarged portion that abuts lip 18. A sheet metal retainer 22, of generally channel shape, provides spaced inturned circumferential flanges for engaging the outer side of stopper 20 and the underside of lip 18. The retainer 22 is appropriately scored at 23, and permits grasping of a tab 24 (shown in broken lines in FIG. 1) that is normally positioned against the top of the stopper 20. Appropriate manipulation of tab 24 and tearing away of the attached segment 25 located between score lines 23, from the position shown permits of simple and ready removal of retainer 22.

A supply of reconstituting liquid 26 for the lyophilized vaccine is provided in a syringe or other container, such as the glass vial 28 that has extending therefrom a hollow needle, or tube, 30 with bevelled, or sharpened, piercing tip 32. The needle 30 is connected to vial 28 by means of an adapter, or ferrule, 34 as well known in the art. A rubber sleeve-type cap 26 normally protects the needle 30. When the retainer 22 and th ecap 36 are removed from their respective parts, and the needle 30 is thrust through pierceable stopper 20, the reduced pressure in container 10 operates to permit the liquid 26 to enter container 10 to reconstitute the dried vaccine 12.

Thus far what has been described is well known in the art, and the claims herein appended are not intended to cover any part of the system described except insofar as a portion thereof cooperates with the novel dispensing device that is hereinafter described.

After the vaccine has been reconstituted, the container 10 has therein a supply of liquid vaccine 38. The stopper 20 is then removed and a dispensing head of relatively flexible material generally indicated at 40 in FIGS. 3 and 4, is mounted across the mouth of the container to be frictionally retained therein. The dispensing head 40 is shaped generally as a cap and defines an elongated annular connector portion including a circumferential skirt 42 for frictionally gripping the exterior of lip 18. If desired, the lower edge of skirt 42 may have formed integrally therewith an inturned bead, or flange, 44 that snaps over the lip 18 to engage the underside thereof adjacent neck 14 and to provide for increased retention of the head 40 onto the container. The skirt 42 is also formed with an inwardly extending enlargement or land 46 adapted to engage the upper or outer face of lip 18 and a transverse cap or diaphragm 47 bridges the area encircled by the skirt 42. The land 46 is generally circular to engage lip 18, but is incomplete to form a port, or opening, 48 through which the liquid 38 passes when the container is tipped to the position of FIG. 2.

Formed on the skirt 42 between the upper and lower boundaries of the head 40, and extending laterally from said skirt is an elongated spout-like structure 50 whose axis extends generally transversely of the axis of the connector skirt 42. The spout-like part 50 is generally frusto-conical and hollow with the opening at the large end of the spout part communicating with port 48 adjacent skirt 42, and the distal end of the spout part 50 defining a small discharge orifice 52 therein at the discharge tip of the spout. The hollow interior 54 of spout 50 constitutes a well that communicates with the interior of the container 10 and which is capable of receiving therein a substantial portion of the liquid 38 within container 10.

Now, when the container is held in a dispensing position as seen in FIG. 2, a portion of the liquid 38 enters spout 50 preparatory to dispensing. The orifice 52 is selected to be so small and restricted, that no liquid discharges therefrom when held only at the attitude of FIG. 2 with the liquid 38 under only atmospheric pressure. When manual pressure is exerted against the outer side of flexible diaphragm 47 inwardly toward the container, by a finger or thumb, pressure is thereupon built up in the container to a level above atmospheric pressure which operates to apply a dispensing force onto the liquid in the well 54 of spout 50, so as to express a small selected amount of liquid vaccine therefrom through discharge orifice 52. FIG. 2 shows a small drop 56 being discharged from spout 50 onto the points 58 of the ring-type scarifier-vaccinator 60.

To assist in achieving the development of pressure in container 10 which causes expressing of liquid from spout 50, a portion of the outmost surface of dispensing head 40 is thinned down to permit of greater flexing by simple digital manipulation. In FIG. 2 the thinned portion is shown at a circular portion 62 located centrally of diaphragm 47 and spaced from the entry to spout 50. Desirably, the portion of diaphragm 47 most easily flexed should be in contact with the air or gas space in container 10, and accordingly it is preferred that the thinned portion to be located diametrically of spout 50 on the opposite side of the center of container 10, as indicated at 62' in FIG. 3. Under some circumstances it may be desirable to distort a portion of spout 50 to achieve expressing of liquid therefrom, and accordingly the surface **50*a* that serves in part to define spout 50** may be thinned so as to be easily flexed.

When the container 10 is in the position of FIG. 2, the cylindrical wall thereof permits easy grasping thereof with the fingers of a hand wrapped therearound and with the thumb conveniently positioned to depress the diaphragm 47 inwardly to express liquid from spout 50.

In the modified form shown in FIG. 4, the dispenser head 40' is shaped to provide a continuous circumferential contact with lip 18 of container 10 on both upper and lower sides thereof by means of flanges 70 and 72 joined by skirt 74. The diaphragm or transverse wall 76 of head 40' is shaped to provide a port or opening 78 that communicates both with the interior of container 10 and the interior or well 79 of a frusto-conical hollow spout 80 that extends axially outwardly of diaphragm 76 as well as extending radially relative to skirt 74. The entire diaphragm 76 may be thin enough, as shown, to be flexed to provide for pressurized expression of liquid from spout 80.

The dispensing heads 40 and 40' may be made from any suitable flexible material, such as polyethylene, or natural or synthetic rubber, or other suitable synthetic material, that will provide for sealing contact where desired, such as where the head engages any portion of the lip 18, while still providing for flexibility in the diaphragm 47 or 76 to permit of manual actuation to effect expressing of liquid from the spouts 50 or 80.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An improved dispensing head for use in a drop dispenser that consists of the combination of an elongated container having an open mouth at one end and having therein a supply of liquid that is to be dispensed dropwise, and a manually actuatable dispensing head that serves both as a removable closure for the open mouth of the container and as a control for the dropwise dispensing of the liquid; said improved dispensing head comprising: a substantially planar diaphragm of flexible material, attachment means located to one side of and spaced from said diaphragm and adapted to engage and removably attach the dispenser head to the container, land means between the attachment means and diaphragm arranged to abut the container and serving to maintain the diaphragm spaced from the container, said land means being interrupted to form a laterally opening port means located between the plane of the diaphragm and the container, and a hollow drop-dispensing spout communicating with said port means.

2. A device as in claim 1 wherein the spout is elongated and the hollow therein is generally frusto-conical to provide a well in the spout located outwardly of the land means for receiving thereinto a supply of liquid from the container when the container is tipped to a dispensing attitude, and the opening at the distal end of the hollow in the spout being restricted to prevent flow of liquid therethrough under normal amospheric pressure, but permitting expressing of liquid therethrough under pressure greater than atmospheric pressure.

3. A device as in claim 1 wherein the land means is generally circular, and a portion of the diaphragm spaced centrally of the land means is thinned to permit of greater flexing thereof.

4. A device as in claim 1 wherein the hollow spout is elongated and is located within the space defined between a plane through the other side of the diaphragm and a plane through the edge of the land means which engages the container.

5. A device as in claim 1 wherein a portion of the diaphragm spaced diametrically of the spout means is thinned to provide for flexing thereof to pressurize the gas space in the container when the container is tipped to a dispensing attitude.

References Cited

UNITED STATES PATENTS

| | | | |
|---|---|---|---|
| 2,804,240 | 8/1957 | Anderson | 222—207 |
| 3,105,618 | 10/1963 | Whitley | 222—207 |

FOREIGN PATENTS

| | | |
|---|---|---|
| 82,714 | 12/1956 | Denmark. |

ROBERT B. REEVES, *Primary Examiner.*

N. L. STACK, *Assistant Examiner.*